Oct. 26, 1971  E. H. LAND  3,615,127
MOTION PICTURE SYSTEM WITH COMPACT MULTIPURPOSE CASSETTE
Filed Aug. 28, 1968  2 Sheets-Sheet 1

INVENTOR.
Edwin H. Land
BY
Brown and Mikulka
and
William D Roberson
ATTORNEYS

Oct. 26, 1971 E. H. LAND 3,615,127
MOTION PICTURE SYSTEM WITH COMPACT MULTIPURPOSE CASSETTE
Filed Aug. 28, 1968 2 Sheets-Sheet 2

INVENTOR.
Edwin H. Land
BY
Brown and Mikulka
and
William D. Roberson
ATTORNEYS

United States Patent Office 3,615,127
Patented Oct. 26, 1971

3,615,127
MOTION PICTURE SYSTEM WITH COMPACT
MULTIPURPOSE CASSETTE
Edwin H. Land, Cambridge, Mass., assignor to Polaroid
Corporation, Cambridge, Mass.
Filed Aug. 28, 1968, Ser. No. 755,901
Int. Cl. G03b 23/02
U.S. Cl. 352—78                                      17 Claims

ABSTRACT OF THE DISCLOSURE

Motion picture apparatus including a compact film handling cassette adapted to facilitate film exposure operations when mounted in a camera and film processing and projection operations when mounted in a projector. Such cassette is supplied with a strip of unexposed photographic film interconnected between a pair of reels and includes a film gate to facilitate exposure and projection operations, a processing station and a drying station. Exposure of the film may be effected during a first advancement thereof from the supply reel to the takeup reel across the film gate. Processing may be effected as the exposed film is returned through the processing station to the supply reel, and drying and exposure operations may be effected as it is once again advanced from the supply reel, through the drying station and across the film gate, onto the takeup reel. Projection operations are also facilitated by a prism permanently mounted within the cassette.

BACKGROUND OF THE INVENTION

This invention is directed to a system having as a principal purpose the simplification of the techniques of exposing, developing and projecting motion pictures. In the recent history of cinematography certain simplifications have been made in some of the processes of obtaining or of viewing motion pictures. For example, cassette systems have been offered by which the single act of the exposure of cinematographic films is accomplished through the use of a simple cassette easily loaded into motion picture cameras for exposure therein. Although motion camera cassettes have simplified the processes of loading and removing of film from a camera, they have not simplified the subsequent stages of development or viewing of the film. Exposure of the film is, of course, only the first step in obtaining a visible image for viewing purposes. Typically, exposed cinematographic films are sent to film developing laboratories frequently great distances from the user and are returned subsequently by mail or otherwise in a completely different container from that in which the film was originally exposed. The developed film, returned to the user days or even weeks after its exposure, is typically threaded into and through a projector mechanism and run between reels which are generally unconnected with each other except through the projector mechanism.

In recent years, some projector cassettes have found their way into usage. These typically store large quantities of film previously exposed and developed in different supply systems. Projection cassettes often are constituted by large pieces of apparatus containing film laboriously edited and assembled from a number of film strips. Accessibility to individual portions of films in such projector cassettes has not been particularly satisfactory or easy to accomplish.

What the motion picture arts have lacked is a compact multipurpose cassette system capable of use not only in the camera but also in the projector and in which film processing operations may be carried out to make the images recorded on the film instantly accessible and capable of being edited simply by the selection and sequential projection of film contained in serially arranged cassettes.

SUMMARY OF THE INVENTION

This invention concerns a motion picture system wherein use is made of a compact multipurpose film cassette within which the several operations of exposure, chemical processing, drying and projection of the recorded images may be accomplished without once transferring the film from the cassette to any other container or even removing the film from the original cassette. This system provides instant access to the motion picture film strip at any stage in its use including not only the initial exposure of the film but also the final projection of images recorded on the film. A preferred embodiment of the cassette comprises coplanar supply and take-up reels to which opposite ends of the film strip are permanently attached. The unexposed photosensitive film strip initially wound upon the supply reel, preferably passes from the supply reel through a film drying station through which a drying current of air may be pumped between input and output ports. The drying station, however, is of principal utility not in the exposure stage, but in a stage subsequent to the development of the film. After passing through the drying station the unexposed film passes through a film gate for exposure to image bearing light. Beyond the exposure station the film is wound onto a take-up reel in the customary manner.

When substantially the entire length of the photosensitive film strip in the cassette has been exposed and has been wound onto the take-up reel, the cassette is then loaded into a special-purpose projector in which the motion of the film is reversed, this time passing from the take-up reel onto the supply reel. In its movement in the reverse direction, the film strip is subjected to a processing treatment. In this treatment a viscous processing fluid is applied to exposed portions of the film strip by means including a doctor blade. The doctor blade itself is supplied with a limited amount of viscous development fluid which soaks into the emulsion on the photosensitive film to effect the development of the latent photographic image and to transfer it by diffusion to an image-receptive stratum. A negative emulsion is used which, after development possesses low covering power and which therefore need not subsequently be removed from the film strip. Partly because of the subsequent passage of the film strip through the drying chamber on its return to the supply reel, a skin is formed on the processed photographic emulsion, thus providing a dry surface which prevents the convolutions of the film strip from adhering to themselves as they are wound upon the supply reel. The rewinding of the film onto the supply reel is preferably accomplished rapidly just before projection of the film.

After the film has been processed and rewound in a partly dried condition, it is then returned at a slower projection pace, this time being completely dried as it passes through the drying station on its way to the film gate. A specially important feature of the invention resides in the fact that a prism is mounted behind the film at the film gate. The prism is adapted to admit light directed through it by a condenser system in the projector. The projection light is directed into the side of the cassette and reflected by the prism through the film and outwardly through projection optics included in the projector. This prism, mounted as a permanent part of the cassette, simplifies the optics and the mechanical features of the projector adapted to accept the cassette. The prism is also responsible for maintaining the effective aperture of the projection optics within a limited space whereas a mirror-type reflector would significantly reduce the effective aperture within the same space. It also permits the cassette to be introduced simply into a projector without the necessity of introducing optical portions of the projector into the cassette structure or of pulling the film from the cassette to thread it through a projector station.

The multipurpose cassette thus contains stations for the initial exposure of the film, the subsequent processing and drying of the film and finally for the projection of the images recorded on the film. All of these functions are provided in a compact relatively flat cassette of modular construction.

Thus it is among the objects of this invention to provide a motion picture system employing a compact motion picture film cassette useful for the exposure, for the processing and for the projection or viewing of the film contained therein, and from which casette the photographic film need never be removed from the time it is first loaded in its photosensitive state to the time its fully developed images are projected onto a screen or otherwise presented for viewing purposes.

BRIEF DESCRIPTION OF THE DRAWINGS

These and other objects of the invention may be seen more fully in connection with the following detailed description taken together with the accompanying drawings wherein.

DETAILED DESCRIPTION

Figure 1:
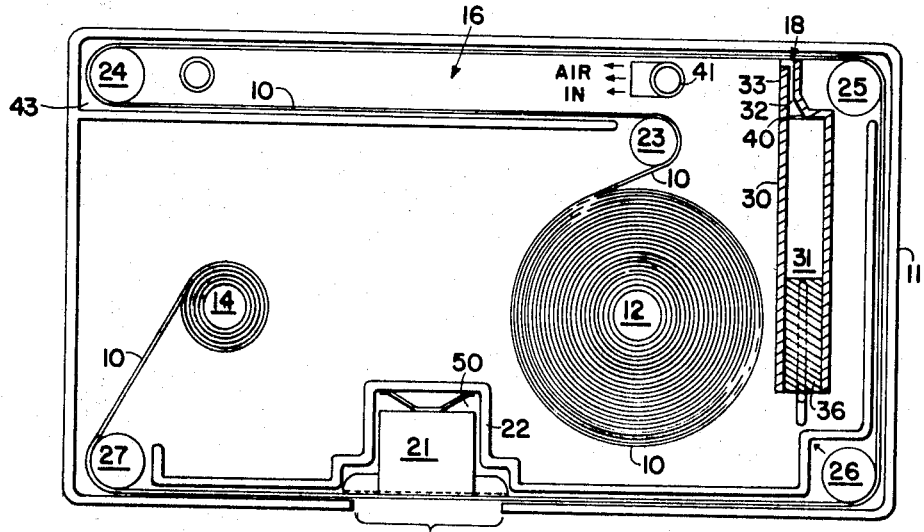
FIG. 1 is a plan view of the interior of a multipurpose motion picture film cassette constructed in accordance with this invention.

The currently preferred embodiment of this invention makes use of a film assembly which comprises both a photosensitive negative emulsion and an image-receiving layer to which a positive image may be transferred by diffusion during development without the necessity thereafter of removing the emulsion containing its developed negative image. This is possible if the developed negative image has low covering power.

In typical silver transfer-reversal processes for the production of black-and-white images, a silver halide developer and a silver halide solvent are applied in an aqueous alkaline solution to a photoexposed silver halide stratum or emulsion, where they develop exposed silver halide to silver and react with unreduced silver halide to form a soluble silver complex. This complex, in order to form a positive print, is transferred and reduced to silver on a silver-receptive stratum upon which the silver halide stratum has been superposed. It has generally been the practice, in the completion of this process, to separate the silver-receptive and silver halide strata in order to render the positive print visible.

The positive print may, however, be rendered visible without the separation of the silver halide and silver-receptive strata. For example, the silver-receptive stratum may be so constituted as to provide an unusually vigorous silver precipitating environment which causes the silver deposited upon it, in comparison with silver developed in the silver halide stratum, to possess very high covering power, that is, opacity per given mass of reduced silver. If the silver halide is in such a concentration as to give rise only, when fully developed, to a predeterminedly low maximum density, and if the silver complex is reduced to silver in a vigorous silver precipitating environment, the resulting negative and positive prints in superposition provide a composite print that presents a good image for projection purposes as long as they are contained on a transparent support. Because the silver halide stratum and the silver-receptive stratum need not be separated, an overall simplification of the silver transfer-reversal process is achieved.

A composite film assembly of this type as well as processing compositions for producing a fully developed black-and-white image without the necessity of removing the developed negative image after processing are shown in my prior U.S. Pat. 2,861,885 which issued Nov. 25, 1958. Other composite film assemblies capable of producing developed full-color images without the necessity of removing the developed emulsion are shown in my prior U.S. Pats. 2,726,154, issued Dec. 6, 1955, and 2,944,894, issued July 12, 1960. The present invention is not directed to the chemistry by which images are developed in the photosensitive emulsion and transferred to an image-receiving stratum. However, in the practice of this invention, whether the film employed is black-and-white film or color film, it is preferably of a type not requiring the removal of the negative emulsion after it is developed.

Figure 2:
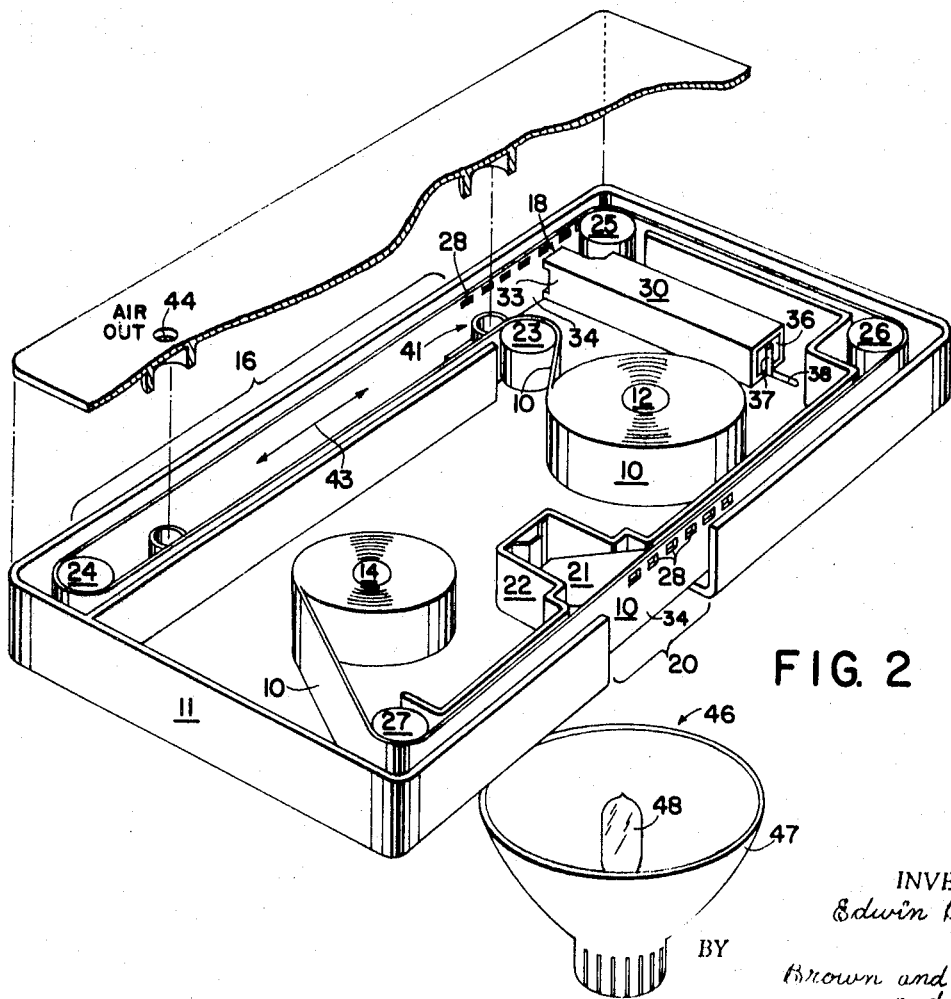
FIG. 2 is a perspective view of the cassette showing the relationship of the cassette to a projection light source and with the cover separated therefrom and broken away to reveal some of its functions.

In the plan view of the cassette assembly shown in FIG. 1 as well as in the perspective view of FIG. 2 such a film strip 10 is shown incorporated within an opaque light-tight housing 11. Initially most of the film in its photosensitive state is coiled on and permanently attached to one end of a rotatable supply reel 12, the film being wound thereon with the emulsion side facing inward and the transparent film base outward. The opposite end of the film strip is also permanently attached to a rotatable take-up reel 14. In its somewhat circuitous path of transportation from the supply reel 12 to the take-up reel 14 the film passes several functional stations utilized at different periods in the life cycle of the cassette. The order of the passage of film through these several stations is not, however, the same as the sequence with which the stations are brought into operation. From the supply reel 12 the film strip 10 passes first through a film drying station 16. The film strip then passes through a film development station 18 and thereafter through a film gate area 20 with a built-in prism 21 mounted behind the film strip. The film gate 20 functions at different times as an exposure station and as a projection station. Baffles 22 behind the film gate area and the prism 21 prevent light from penetrating the interior of the cassette.

The first use of the cassette is for exposure of the photosensitive film contained therein in a photographic camera. In this usage the film gate 20 is an exposure station through which images are directed by a camera lens and through a camera shutter onto the photosensitive film in its passage from the supply reel to the take-up reel. During the exposure sequence the film drying station 16 and the film development station 18 are passive. The film 10 passes around an initial pulley 23 and subsequently in sequence around four additional pulleys 24, 25, 26, and 27 located respectively in the four corners of the cassette. The film is drawn onto the take-up reel 14 by power supplied thereto in the camera. Simultaneously it is advanced past the exposure station 20 in increments by a typical claw mechanism or the like cooperating with the sprocket holes 28 provided adjacent one edge of the film strip. In the embodiment illustrated, the photosensitive surface of the film strip faces inward such that exposure of the emulsion is effected through the transparent film base.

Pulley 26, around which the film strip passes on its way to the film gate, may if desired be mounted on a movable post spring biased toward the corner which it occupies in the cassette housing and capable of being moved resiliently inward away from the corner. Concurrently, pulley 27 may be designed in accordance with current practice to provide a snubbing action. This represents one way to minimize strain on the film strip by the intermittent film advancement structure engaging the sprocket holes 28 of the film.

In its first use in the camera, the combination cassette assembly functions similar to other camera cassettes. After the entire length of film has been exposed to image-bearing light, substantially the entire length of the film will then have been coiled onto the take-up reel 14 and unwound from the supply reel 12.

Figure 4:
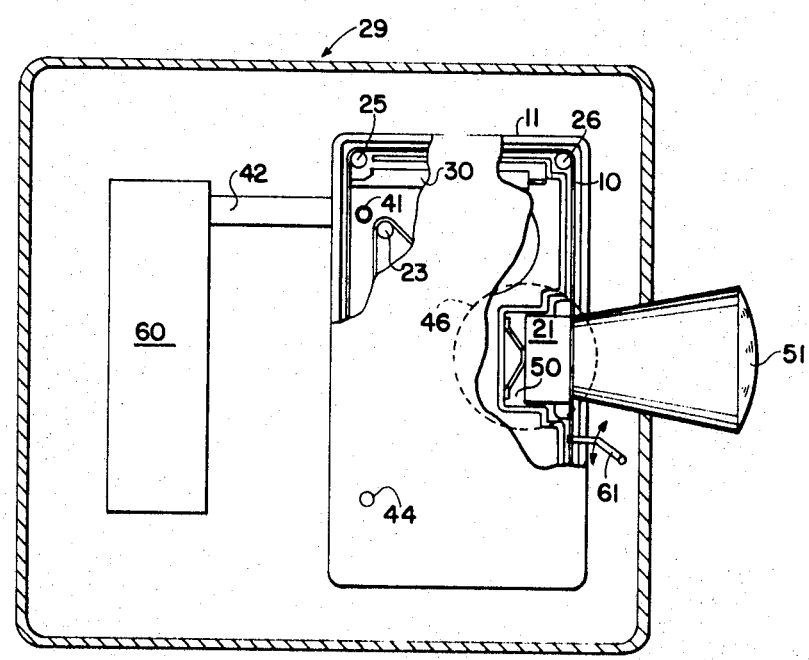
FIG. 4 is a plan view, partly in perspective of a projector constructed in accordance with this invention showing in cooperative relationship therewith the cassette illustrated in the previous drawings.

The next stage of operation, the film processing stage, may be accomplished in the same camera in which the film was exposed but is preferably accomplished in a projector 29 such as that shown in FIG. 4. The film is processed during a rapid rewind of the exposed film from the take-up reel 14 to the supply reel 12. Processing is accomplished in part by means of a container 30 having therein a supply of viscous developing fluid 31. One end of the container 30 comprises an orifice 32 which acts as a nozzle feeding a doctor blade 33 to supply a carefully measured thickness of the viscous film processing fluid 31 to only that width of the photosensitive film strip surface on which images have previously been recorded. The doctor blade 33 is spaced a carefully predetermined distance from the surface of the film strip to express a metered thickness of viscous developer onto the photosensitive surface of the film.

As best seen in FIG. 2, the doctor blade 33 extends across only part of the total width of the film, i.e., that intermediate portion of the film strip width on which the latent images are recorded. In this way no film processing composition is applied to the area of the film occupied by the sprocket holes 28 or to the opposite edge area 34 of the film. The edges of the film may, therefore, be employed as dry bearing surfaces in the subsequent passage of the film around pulley 24 on its way back to the supply reel 12. Additionally, edge area 34 may carry a magnetic strip for use as a sound track.

The amount of processing composition required to be held in container 30 is not large. One reason for this is that the developing composition is applied sparingly to only those portions of the film requiring chemical treatment after exposure. Additionally, it is not necessary to supply a thick layer of processing composition to provide adequate development of the negative and the transfer by diffusion of the positive image onto the image-receiving stratum of the film strip. No more than 3 cc. of viscous developing reagent is necessary to treat an image-bearing area approximately 5.4 mm. wide. If the initial thickness of the photosensitive film strip is approximately .076 mm., after treatment and drying the strip may increase in thickness only to about .081 mm. on a film strip 15 meters in length. By the use of a viscous developing reagent and by the economical distribution of the viscous reagents on the surface of the film by a doctor blade, a great economy of materials may be effected. Thus it is possible to provide a very compact multipurpose motion picture film cassette with an included processing station.

During the processing of the film on its return trip to the supply reel 12, the viscous development composition 31 should be expressed from the orifice 32 behind the doctor blade 33 with sufficient pressure to insure its adherence to the surface of the film. One way this may be accomplished is by means of a plunger 36 which is movable pistonlike within the container 30. The plunger may be biased in the direction of the orifice 32 by a plunger driver 37 projecting inward through a slot 38 in the wall of the cassette. Before the plunger driver 37 is brought to bear against the plunger 36, the processing fluid 31 may be prevented from leaking out to the orifice 32 by a rupturable membrane 40 which is capable of being broken by the application of a sufficient initial force. The plunger driver cooperates with and may even be a part of the projector mechanism and is brought into action by the projector during the time that the film is being rewound onto the supply reel. The plunger driver may, however, be provided as an integral part of the cassette structure mounted for sliding movement between guides in the wall of the cassette and extending through the wall for engagement with an appropriate operator member in the projector. However the plunger driver 37 is mounted, its entry through the wall of the cassette should be baffled to prevent fogging of the film by light leaks prior to development.

As the viscous reagent is being expressed to the sensitive surface of the exposed film strip, the film may be wound with almost surprising speed onto the original supply reel 12 without causing any adhesions between the overlapping convolutions of the film strip. The entire length of 15 meters of film may be processed and coiled upon the supply reel in as short a period of time as 30 seconds. For rewinding purposes, it is not necessary for the film strip to be completely dry as long as the surface of the wetted film strip is sufficiently dry to provide a skin or protective layer over the still damp emulsion beneath. To assist in the formation of this initial protective skin, the film strip is preferably passed through the drying station 16 which is preferably rendered functional at this stage.

With the film cassette positioned in the projector as shown in FIG. 4, connections are made between the light-baffled orifice 41 and a duct 42 delivering forced air for drying purposes. Air pumped through the orifice 41 passes through an elongated drying chamber 43 and out through one or more output ports 44 at the opposite end of chamber 43. It is to be noted that in the embodiment shown the film strip passes first along one side of the drying chamber 43 and then back along the other side, exposing its treated surface thus twice to the drying influence of the air passing through this chamber. This doubles the effective length of the chamber. Complete drying of the film is, nevertheless, not accomplished in the space of 30 seconds total rewind time. The complete drying is left to the next stage during which the film is once again advanced from the supply reel to the take-up reel at the more leisurely rate used in the projection of the film strip.

During the projection of the fully developed film strip 10, unique and effective use is made of the prism 21 behind the film strip at the film gate 20. Prism 21 collects light from a light source 46 indicated by the dotted lines in FIG. 4 as being on the opposite side of the cassette. FIG. 2 shows the general relationship between the light source 46 and the prism 21. The particular light source shown comprises a condenser 47 in the form of a concave reflector surrounding a lamp 48. The reflector 47 in this embodiment should direct reflected light rays in steeply converging directions toward the entrance face of the prism, the prism being exposed to the light from the source through a transparent opening 50 in the side of the cassette adjacent the film gate 20. Of course, any other condensing system such as the typical condensing lenses found in many projectors may also be used.

It is to be noted that a portion of the projection optics, namely the prismatic element 21, is actually contained within the film cassette as a permanent part thereof. This prismatic element is brought into direct cooperate relationship with the other projector optics to redirect light from the source 46 through the film and the projection lens 51. Several unique advantages stem from this. In the first place, the cassette assembly may be very simply inserted into a complementary projector mechanism without the necessity of removing a loop of film from the cassette and feeding it through the optical system of the projector. Nor is it necessary for the projector to include a movable mirror assembly to be thrust into an aperture in the cassette during loading operations. Beside simplifying the projector, the permanent prism in the cassette offers other advantages above and beyond those offered by the use of any mirror mechanism. An angularly disposed reflecting surface behind the film gate 20 necessarily places a limit on the proximity between the film gate and the light source of the projector. The larger the distance between the film gate and the condensing system of the projector, the smaller the effective aperture of the light source. By the use of a prism which has an index of refraction very substantially larger than the index of refraction of air, a large numerical aperture of the light source is achieved within a limited space. This results from the fact that the large solid angle of projection light impinging upon the entrance surface of the prism 21 is effectively narrowed and efficiently funneled toward the film positioned in the film gate. A simple reflector cannot do this.

Figure 3:
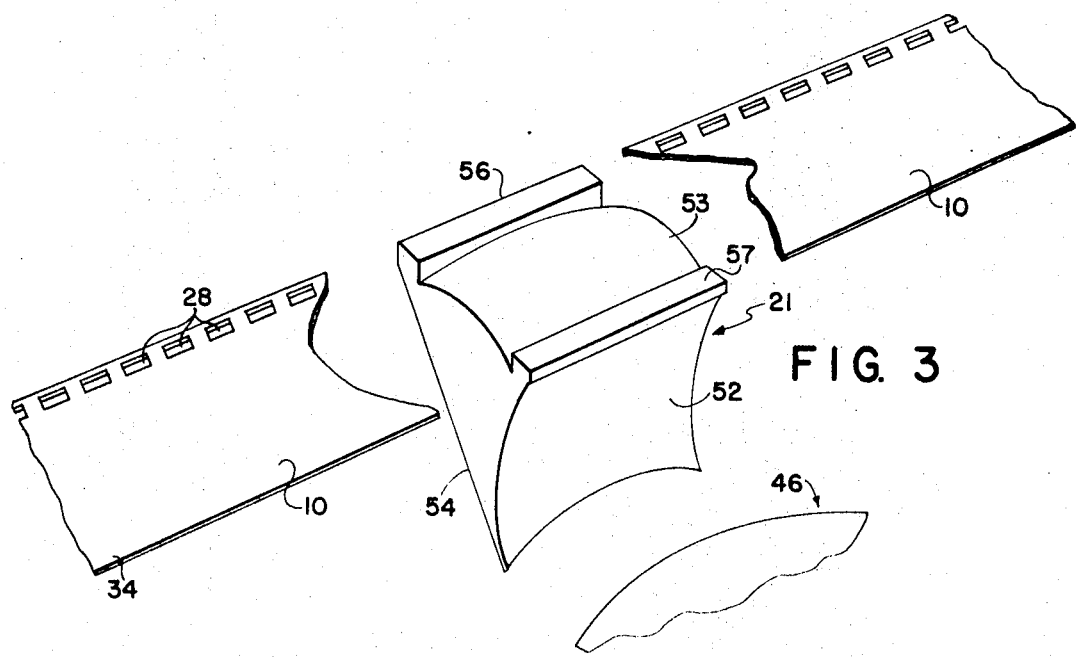
FIG. 3 is a perspective view of a preferred form of prismatic element included within the cassette of FIGS. 1 and 2 and showing the cooperation of this prismatic element with the film and with a portion of the projection optics.

To further improve the light collection efficiency of the prism, the prism is preferably given a configuration such as that shown in FIG. 3. In this figure it can be seen that the prism comprises a concave entrance surface 52 and a convex exit surface 53 immediately adjacent the film plane. The concave entrance surface of the prism acts as a negative lens to accept the sharply converging light rays from the condenser system and refract them more nearly parallel. After the entering light rays are reflected from the reflection surface 54 of the prism, they are directed through the convex surface of the prism from which they emerge once more at steeply converging angles to illuminate the image-bearing film efficiently. The prism is preferably formed of a transparent plastic exhibiting substantial resistance to heat. It is formed with parallel bearing surfaces 56 and 57 on opposite sides of the convex surface 53. During exposure and projection the film strip 10 is guided and confined within the proper film plane within the film gate partly through contact with these bearing surfaces.

When the cassette is introduced into the projector 29 with reels 12 and 14 coupled to appropriate driving means, the baffled orifice 41 is also connected to the duct 42 which delivers air from a heater and blower 60. This forces a stream of warm air through the heater duct 42 through the length of the drying chamber 43 and out through output port 44. The projector mechanism also includes an incremental film advancing mechanism comprising, for example, a reciprocating claw 61 operated in coordination with an intermittent projector shutter not shown in the drawings. Any suitable mechanism for incrementally advancing the film past the film gate and for opening and closing the shutter in coordination therewith may be used. When the film cassette is in the projector and the film is being rewound onto the supply reel, some means should be provided to cover the film gate and its adjacent prism to prevent light from being admitted to the film before the film is developed. If the projector mechanism is light-tight, this may easily be accomplished simply by turning off the projector light source and by keeping the projector shutter closed during this operation. This may be accomplished by an interlock system which prevents the lamp from being lit or the shutter being opened whenever the cassette is being rewound.

Many variations and different embodiments of this invention are possible within the scope of these teachings. For instance, it may be desirable in some instances to utilize a second doctor blade in the cassette for treating the developed film, as it passes from the reel 12 to the drying station 16, with a neutralizing substance or a protective coating. Additionally, although the invention has been described in connection with the use of a film from which the negative need not be removed after development, the invention may also be practiced in connection with a film from which the negative is removed after development. With such a film it would then be necessary to include an additional functional station within the cassette at which the negative is scraped, sponged or otherwise removed from the film although this is not the currently preferred mode of utilization of the present invention.

The incorporation of a permanent prismatic element at the film gate of the cassette makes possible other advantages. For example, a camera constructed to receive a cassette of this type may, with minor modifications, be used not only in the exposure of the film, but also for viewing of the film after it has been fully developed. One way in which this might be accomplished would be to incorporate in the camera a source of light adjacent the entrance surface of the prismatic element. This could be in the form of a normally closed but openable light collecting lens or window, or alternatively, a built-in examination light for directing light into the prism. The camera may then be utilized by the operator to view the developed film directly through the lens of the camera itself. It is well known that a typical motion picture camera lens is far superior to the usual lenses employed for close-range visual inspection of motion picture films.

Since these and other variations of the invention and its modes of utilization may be made within the scope of the present teachings, it is intended that the matter contained in this description should be interpreted as illustrative and not necessarily limiting on the scope of the invention.

What is claimed is:

1. A motion picture film cassette assembly for exposing a photosensitive film strip, for chemically processing and then for projecting or viewing the exposed and processed photographic film strip comprising:

an enclosed opaque housing;
an unexposed photographic film strip coiled at an initial position within said housing;
a film gate for access of light to selected incremental portions of said film;
means for advancing said film strip within said housing from its said initial position past said film gate to facilitate film exposure operations, for returning said film strip to its said initial position and for again advancing said film strip from its said initial position past said film gate to facilitate projection or viewing operations;
a film processing station within said housing for applying to the exposed film strip a moist film developing composition to develop to a visible condition images recorded on said film prior to its second advancement from its said initial position past said film gate; and,
a film drying station located in the path of movement of said film strip between said initial position and said film gate for removing liquids from said film at least while said film is being advanced a second time from its said initial position past said film gate;
whereby upon the second advancement of said film strip from said initial position said film gate may perform the function of a projection station for the projection of or similar visual access to exposed, developed and dried images recorded on said film strip.

2. A motion picture film cassette for exposing a photosensitive film strip, for chemically processing and then for projecting or viewing the exposed and processed photographic film strip comprising:

an enclosed opaque housing;
an unexposed photographic film strip coiled at an initial position within said housing;
a film gate for access of light to selected incremental portions of said film;

means for advancing said film strip within said housing from its said initial position past said film gate to facilitate film exposure operations;

means for returning said exposed film strip to its said initial position;

a film processing station within said housing made operative during the return movement of said exposed film strip for applying to said exposed film strip a moist film developing composition to develop to a visible condition images recorded on said film; and prism means mounted in said cassette adjacent said film gate on the opposite side of said film from said film gate to form a portion of an optical projection system, said prism means having an index of refraction substantially larger than that of air and including transparent angularly disposed faces thereon and at least one reflecting surface for reflecting light entering one of said transparent faces through the other of said transparent faces for the projection of or similar visual access to images recorded on said film and subsequently developed.

3. A motion picture film cassette assembly for exposing a photosensitive film strip, for chemically processing and then for projecting or viewing the exposed and processed photographic film strip comprising:

an enclosed opaque housing;

an unexposed photographic film strip coiled at an initial position within said housing;

a film gate for access of light to selected incremental portions of said film;

means for advancing said film strip within said housing from its said initial position past said film gate to facilitate film exposure operations;

means for returning said exposed film strip to its said initial position;

a film processing station within said housing made operative during the return movement of said exposed film strip for applying to said exposed film strip a moist film developing composition to develop to a visible condition images recorded on said film;

a film drying station located in the path of movement of said film strip between said initial position and said film gate for removing liquids from said film strip at least while said film strip is being advanced a second time from said initial position past said film gate; and, prism means mounted in said cassette adjacent said film gate on the opposite side of said film from said film gate to form a portion of an optical projection system, said prism means having an index of refraction substantially larger than that of air and including transparent angularly disposed faces thereon and at least one reflecting surface for reflecting light entering one of said transparent faces through the other of said transparent faces for the projection of or similar visual access to images recorded on said film and subsequently developed.

4. In combination with the film cassette assembly of claim 3, a complementary projector for operating said cassette assembly to advance said film strip past said film gate and having an optical system comprising:

a projection light source including condenser means for directing a converging beam of light through said one transparent face of said prism means for illumination of the portion of said film strip positioned in said film gate; and, projector lens means mounted opposite said film gate for projecting images recorded on said film strip.

5. The combination of claim 4 wherein said projector further comprises a source of forced air connectable with said film drying station of said cassette assembly when said cassette assembly is inserted operatively into said projector for directing a drying current of air through said film drying station.

6. A motion picture film cassette assembly for exposing a photosensitive film strip, for chemically processing and then for projecting or viewing the exposed and processed photographic film strip comprising:

an enclosed opaque housing;

a supply reel within said housing containing an unexposed photographic film strip, said supply reel being operative to return said film strip thereto after exposure;

a film gate for access of light to selected portions of said film strip;

means including a take-up reel for transporting said film within said housing from said supply reel past said film gate to facilitate film exposure operations;

a film processing station within said housing located in the path of movement of said exposed film strip from said supply reel to said take-up reel for applying to said film strip after exposure a film developing composition to develop to a visible condition images recorded on said film;

means for rendering said processing station operative during the return of said film strip to said supply reel;

a film drying station located in the path of movement of said film strip from said supply reel to said film gate for removing liquids from said film while said film is being transported from one reel to the other; and, prism means mounted in said cassette adjacent said film gate on the opposite side of said film from said film gate to form a portion of an optical projection system, said prism means having transparent angularly disposed faces and at least one reflecting surface for reflecting light entering one of said transparent faces through the other of said transparent faces and through portions of said film strip located at said film gate for the projection of or similar visual access to images recorded on said film strip and subsequently developed.

7. In combination with the film cassette assembly of claim 6, a complementary projector for operating said cassette assembly to advance said film strip past said film gate and having an optical system comprising:

a projection light source including condenser means for directing a converging beam of light through said one transparent face of said prism means for illumination of the portion of said film strip positioned in said film gate; and, projector lens means mounted opposite said film gate for projecting images recorded on said film strip.

8. The combination of claim 7 wherein said projector further comprises a source of forced air connectible with said film drying station of said cassette assembly when said cassette assembly is inserted operatively into said projector for directing a drying current of air through said film drying station.

9. A composite motion picture film cassette assembly for exposing, developing, drying and projecting an enclosed photographic film strip comprising:

an enclosed opaque housing;

a photographic film strip contained within said housing with a sensitized surface including an image-receiving stratum and a photosensitive emulsion from which exposed and developed images may be transferred by diffusion to said image-receiving stratum;

film storage and translating means including a supply reel and a take-up reel for advancing said film strip within said housing in a forward direction to said take-up reel and in a reverse direction to said supply reel, said film strip being permanently connected at its opposite ends to said supply and take-up reels respectively;

a film gate operative both as an exposure station to record images on said film strip and as a projection station for the projection of images after exposure, processing and drying of said film strip;

a film processing station within said housing including a container of a viscous moist film processing composition, a doctor blade, means for locating said doctor blade a predetermined distance from the sensitized surface of said film strip and means made operative on the reverse movement of said film strip after exposure for expressing said composition onto the sensitized surface of said film strip to be spread thereon by said doctor blade; and a film drying station located in the path of movement of said film strip between said supply reel and said film gate for removing moisture from said film strip after said processing composition has been spread thereon, said film drying station including an elongated chamber with entrance and exit ports at opposite ends thereof for the circulation of a drying current of air through the length of said chamber, and means for guiding said film strip from one end to the other of said chamber along one side thereof and thence back along the other side of said chamber to said one end with the sensitized surface thereof facing inwardly of said chamber thereby doubling the effective length of said chamber.

10. The film cassette assembly of claim 9 further comprising:

a light-transmitting window formed in the side of said cassette housing adjacent said film gate; and, a prismatic element having light transmitting surfaces positioned respectively at said light transmitting window and at said film gate and having a reflecting surface to reflect light from said window through the photographic film strip, said prismatic element forming a portion of an optical projection system for the projection of images recorded on said film strip after said film strip has been exposed, developed and dried within said cassette assembly.

11. The combination of claim 10 wherein said prismatic element has formed thereon as integral parts thereof raised film strip guiding surfaces adjacent and on opposite sides of the light transmitting surface positioned at said film gate to locate and guide said film strip within a predetermined optical plane.

12. A motion picture film cassette assembly for exposing a photosensitive film strip, for chemically processing and then for projecting or viewing the exposed and processed photographic film strip comprising:

an enclosed opaque housing;

an unexposed photographic film strip coiled at an initial position within said housing;

a film gate for access of light to selected incremental portions of said film;

means for advancing said film strip within said housing from its said initial position past said film gate for exposure operations and for returning said film strip to its said initial position; and a film processing station within said housing operable when said film strip is returned to its said initial position for applying to the exposed film strip a processing fluid to form visible images from images recorded on said film strip during exposure operations;

whereby upon second advancement of said film strip from said initial position said film gate may perform the function of a projection station of or similar visual access to said visible images.

13. A motion picture film cassette assembly comprising:

an enclosed housing having a prismatic element therein, said prismatic element having transparent angularly disposed faces thereon and at least one reflecting surface for reflecting light entering one of said transparent faces of said element through another of said transparent faces and raised surfaces formed as an integral part thereof extending beyond said other transparent face on opposite edges thereof adapted to support and guide a film strip past said other face; and means for storing a coiled strip of image-bearing motion picture film within said housing and for transporting said strip within said housing past said other transparent face of said prismatic element along said raised surfaces thereof to permit projection of or similar visual access to images recorded on said film by means of light passing both through said prismatic element and through said film strip.

14. A cassette comprising:

an enclosed opaque housing configured to be first mounted in a camera to facilitate film exposure operations and subsequently in a projector to facilitate film processing and viewing operations;

an unexposed photographic film strip coiled within said housing;

means within said housing for exposing incremental sections of said unexposed film strip to record latent images thereon;

means within said housing for processing incremental sections of said film strip after exposure thereof to produce viewable images thereon from said latent images;

means within said housing for projecting incremental sections of said filmstrip after the processing thereof;

means for progressively advancing said film strip within said housing in operable relationship with said exposing means responsive to drive means of such camera when said cassette is mounted therein and for progressively advancing said film strip within said housing first in operable relationship with said processing means and then in operable relationship with said projecting means responsive to drive means of such projector when said cassette is mounted therein, whereby said film strip may be exposed, processed and projected while being continually retained within said housing.

15. The cassette assembly of claim 14 additionally comprising means within said housing for drying incremental sections of said film strip after processing thereof and wherein said advancing means includes means for progressively advancing said film strip in operable relationship with said drying means after said film strip has been processed and prior to its being projected or viewed.

16. The cassette assembly of claim 14 wherein said projecting or viewing means comprises a prismatic light reflecting element mounted within said housing.

17. A cassette comprising:

an enclosed opaque housing configured to be first mounted in a camera to facilitate film exposure operations and then in a projector to facilitate film processing and viewing operations;

an unexposed photographic film strip initially substantially entirely coiled at an initial position within said housing and extending along a given path within said housing;

first means for positioning a light reflecting element behind said film strip at a selected position along said path;

second means for access of light rays from a scene to selected incremental sections of said unexposed film strip to record latent images thereon and for permitting rays from an external source of light to contact such light reflecting element and to be reflected thereby through said film strip outwardly of said housing;

third means within said housing for processing incremental sections of said film strip after exposure thereof to produce viewable images thereon from said latent images; and fourth means for progressively transporting said film strip along said given path in operable relationship to said second means responsive to drive means of such camera when said cassette is mounted therein and for progressively transporting said exposed film strip along said given path in operable relationship with said third means and then in operable relationship with said second means responsive to drive means of such projector when said cassette is mounted therein, whereby said film strip may be exposed, processed and projected while being continually retained within said housing.

References Cited

UNITED STATES PATENTS

| | | | |
|---|---|---|---|
| 2,275,497 | 3/1942 | Berndt | 242—200 |
| 2,560,564 | 7/1951 | Foster et al. | 352—78 X |
| 2,930,302 | 3/1960 | Tuttle | 95—14 |
| 2,931,857 | 4/1960 | Hammond, Jr., et al. | 352—130 X |
| 3,260,186 | 7/1966 | Lowell | 95—90.5 |
| 3,281,199 | 10/1966 | Kingston | 352—78 X |
| 3,282,184 | 11/1966 | Chen et al. | 95—14 |
| 3,367,046 | 2/1968 | Neuberger | 352—130 X |
| 3,383,998 | 5/1968 | Takats | 95—90.5 |
| 3,391,625 | 7/1968 | Jacknau | 95—90.5 |
| 3,265,457 | 8/1966 | Dale | 352—72 X |

LOUIS R. PRINCE, Primary Examiner

J. W. ROSKOS, Assistant Examiner

U.S. Cl. X.R.

352—130